(No Model.) 4 Sheets—Sheet 1.

T. A. CONLEE & J. H. KENNETH.
SULKY PLOW.

No. 251,766. Patented Jan. 3, 1882.

Witnesses:
Albert H. Adams.
B. A. Price

Inventor:
Thomas A. Conlee
John H. Kenneth
By West & Bond
attys (No Model.) 4 Sheets—Sheet 2.

T. A. CONLEE & J. H. KENNETH.
SULKY PLOW.

No. 251,766. Patented Jan. 3, 1882.

Witnesses:
Albert H. Adams.
B. A. Price.

Inventor:
Thomas A. Conlee
John H. Kenneth
By West & Bond
attys.

(No Model.) 4 Sheets—Sheet 3.
T. A. CONLEE & J. H. KENNETH.
SULKY PLOW.
No. 251,766. Patented Jan. 3, 1882.
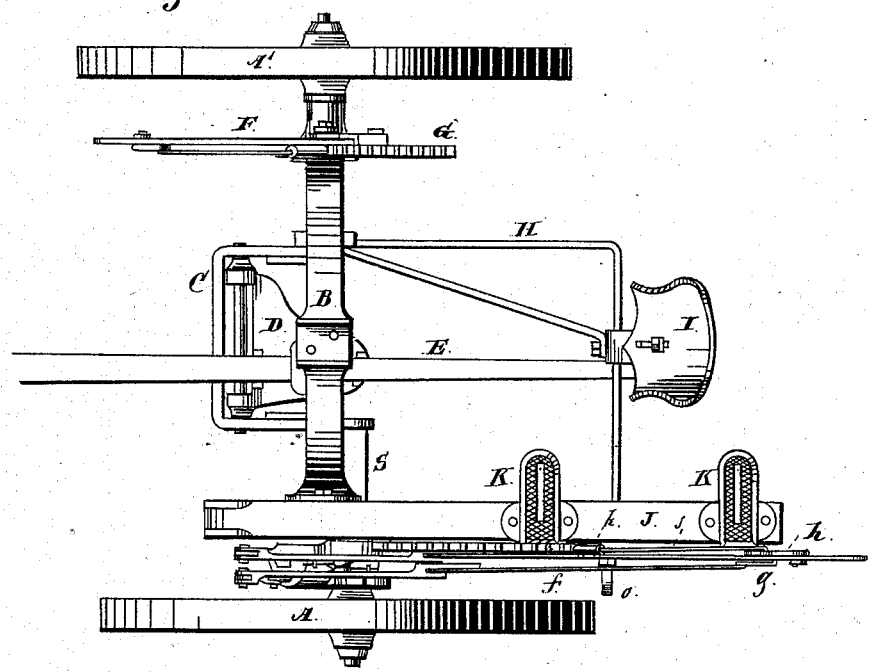
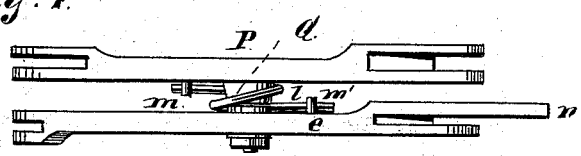
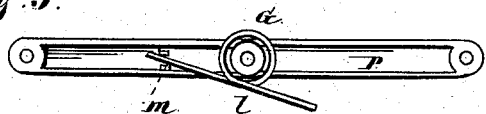
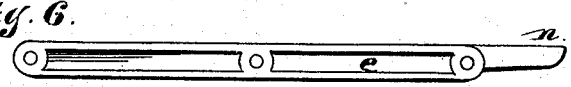
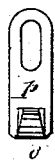
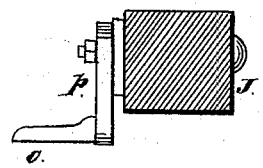
Witnesses:
Albert H. Adams
B. A. Price
Inventor:
Thomas A. Conlee
John H. Kenneth
By West & Bond
attys.
N. PETERS, Photo-Lithographer, Washington, D. C.

(No Model.) 4 Sheets—Sheet 4.

T. A. CONLEE & J. H. KENNETH.
SULKY PLOW.

No. 251,766. Patented Jan. 3, 1882.

Witnesses:
Albert H. Adams
B. A. Price

Inventor:
Thomas A. Conlee
John H. Kenneth
By West & Bond
Attys.

UNITED STATES PATENT OFFICE.

THOMAS A. CONLEE AND JOHN H. KENNETH, OF DIXON, ILLINOIS, ASSIGNORS TO THE GRAND DETOUR PLOW COMPANY, OF SAME PLACE.

SULKY-PLOW.

SPECIFICATION forming part of Letters Patent No. 251,766, dated January 3, 1882.

Application filed March 21, 1881. (No model.)

*To all whom it may concern:*

Be it known that we, THOMAS A. CONLEE and JOHN H. KENNETH, residing at Dixon, in the county of Lee and State of Illinois, and citizens of the United States, have invented new and useful Improvements in Sulky-Plow Lifting Devices, of which the following is a full description, reference being had to the accompanying drawings, in which—

Figure 1:
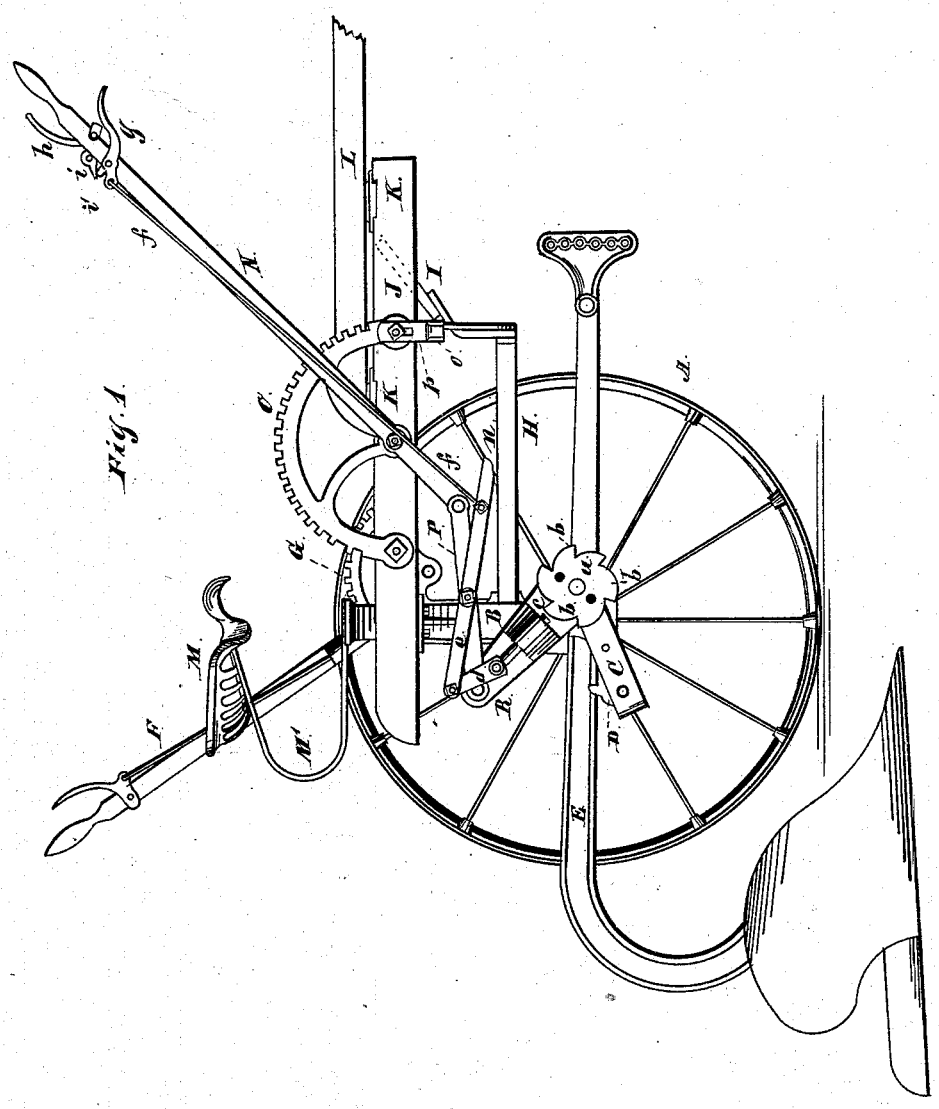
Figure 2:
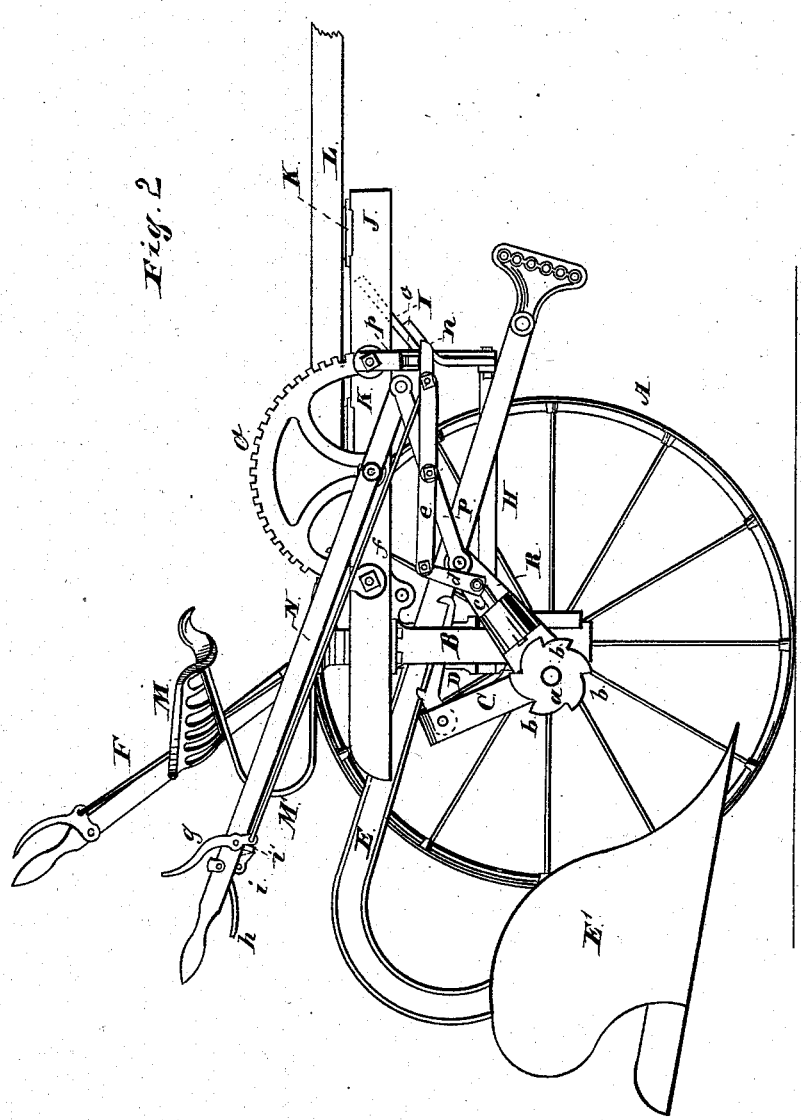
Figures 9, 10:
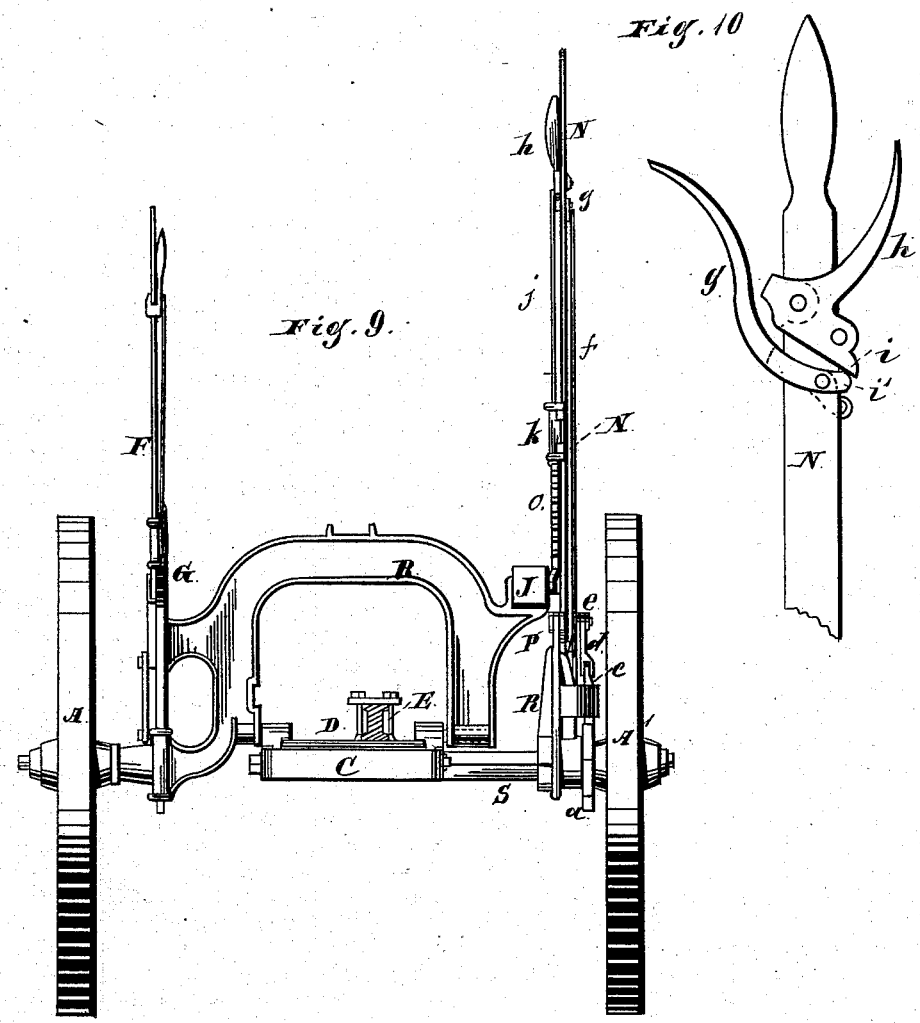

Figure 1 is a side elevation with the furrow-wheel removed, showing the position of the lifting devices when the plow is in the ground; Fig. 2, a side elevation with the furrow-wheel removed, showing the position of the lifting devices when the plow is raised out of the ground; Fig. 3, a top or plan view with the seat and tongue removed, the rear end of the plow-beam broken off, and the lifting devices in the position shown in Fig. 1; Figs. 4, 5, and 6, details of the bars or links connecting the lifting-lever, crank or bail lifting arm, and the sliding catch or lock which engages the wheel; Figs. 7 and 8, details of the stop for raising the sliding catch or lock and releasing it from engagement with the wheel; Fig. 9, a rear elevation with the plow removed; Fig. 10, a detail showing the construction of the bell-crank levers for operating the lever-lock and the slide or catch which engages with the wheel.

The object of this invention is to utilize the draft of the team in raising the plow out of the ground, and have the team lifting devices combined and arranged with and having such relation to the hand lifting devices that either form of lift can be used, as desired, without any change of the parts, and without in any manner impairing the effectiveness of either arrangement in use or interfering with the successful operation of each as separate and distinct operating devices, so far as the method of lifting in each case is concerned, and have the same locking arrangement, by which the plow is held either in the ground or out of the ground, as required, common to both forms of lift, and operative with either in precisely the same manner so far as the lock is concerned, and so arranged with reference to the team-lift that it will be automatically thrown into lock at the completion of the lift and hold the plow suspended, while the levers by which the lock is released and the sliding catch or wheel-lock thrown into engagement have such relation to each other that the movement of either lever operates the other.

Our invention will be fully hereinafter described in detail and the improvements specifically pointed out in the claims.

In the drawings, A represents the land-wheel; A', the furrow-wheel; B, the arch or frame; C, the swinging bail or crank; D, the pivot-plate supporting the plow-beam; E, the plow-beam; E', the plow; F, the lever for operating the leveling device of the land-wheel; G, the segmental rack for holding the lever F; H, the forward or supporting bars or frame; I, the foot-rest; J, the tongue-support; K, the plates to which the tongue is attached, and having slots by which its position can be changed for working two or three horses; L, the tongue; M, the driver's seat; M', the support for the seat. These parts may be constructed and arranged in any of the usual and well-known forms for that class of sulky-plows in which the plow is carried by a crank or bail pivoted to the side pieces of an arch or frame, so that by raising the crank the plow can be suspended above the ground and by depressing the crank it can be made to enter the ground for the required depth of plowing, and having the spindle of its land-wheel attached to the frame or arch, so that by means of the lever F and rack G the frame or arch can be raised or lowered to make the plow run level; but as these parts do not constitute any part of the present invention, they need not be further described, the invention relating simply to devices for raising the crank and lifting the plow out of the ground, which devices are constructed and arranged as follows:

N represents a lifting-lever; O, the segmental rack; P, the connecting-link between the lifting-lever and lifting-arm; Q, the projection on the link P; R, the lifting-arm; S, the connection of the arm R with the bail or crank C; a, the toothed or notched plate; b, the teeth or notches; c, the sliding arm or catch; d, the strap; e, the link for operating the arm c; f, a connecting-rod; g, a bell-crank lever; h, a bell-crank lever; i, a point or projection on the lever h; i', an arm on the lever g; j, a connecting-rod; k, a locking-pawl; l, a spring; m, a pin on the link P; m', a pin on the link e; n, the projecting end of the link e; o, the stop against which the end n strikes; p, the plate carrying the stop o.

The parts constituting the lifting arrangement are arranged on the furrow-wheel side of the machine, and the team-lift acts in conjunction with the furrow-wheel in lifting the plow. These parts are entirely independent of the leveling devices on the opposite side of the frame.

The lever N and the segmental rack O are located on the side of the tongue-support K, the ends of the rack being secured to the support by bolts or otherwise, and the lever being pivoted at the center of the circle of the rack, the lower end of the lever extending a short distance below this pivot, and the upper end being within easy reach of the driver when mounted on the seat.

To the lower end of the lever N is pivoted the forward end of a link or bar, P, the rear end of which is pivoted to the upper end of an arm, R, which arm is rigidly secured to a cross-piece, S, to the inner end of which is rigidly secured the side arm or pivotal piece of the bail or crank C. These parts—the lever N, link P, and arm R—with the cross-piece or connection S, constitute the hand-lift, the operation of which is as follows: The driver on the seat takes hold of the lever N and moves it either forward to lower the crank and throw the plow into the ground or backward to raise the crank and hence lift the plow out of the ground, the forward movement of the lever causing its lower end to move backward, and, through the link P, giving a corresponding backward movement to the arm R, which turns the cross-piece or connection S and lowers the crank D, thus lowering the plow, the backward movement of the lever causing its lower end to move forward and over the link P, giving a corresponding forward movement to the lifting-arm R, which turns the cross-piece or connection S and raises the crank D, elevating the plow, the depth to which the plow enters the ground being gaged by the point at which the lever is carried forward and locked. The connection or piece S is, in fact, an extension of the spindle for the furrow-wheel, and the portion between its inner end and the spindle is left square, and on it adjacent to the plate a is located the lifting-arm R, the lower end of which has a square opening to receive the connection or axle S and make a firm connection between the arm and the axle. The inner end of this connection or axle S has a tenon or other form to enter a suitable opening or be otherwise connected rigidly with the ear or hanger on which is the pivot for the crank or bail, which pivot enters the vertical portion of the frame, as usual.

The arm or lever N is locked in whatever position it may be placed by means of a sliding pawl, k, located on the lever, so that its point, when projected, will engage the notches of the rack, the pawl being projected by means of a suitable connecting-rod, j, one end of which is attached to the upper end of the pawl and the other to a bell-crank lever, h, pivoted to the lever N near its upper end.

The plate a is connected with the inner end of the hub of the furrow-wheel by means of pins, or in any other suitable manner which will make the connection a rigid one; or this plate might be made a part of the hub, if so desired. On the periphery of this plate is a series of notches or teeth, b, one face of which is straight or tangential and the other curved or rounding. On the arm R, in a suitable support or bearing, is located an arm or catch, c, which has a sliding movement up and down, so that its point can be made to engage the straight face of the notches or teeth b, or be left to clear such notches or teeth. To the upper end of this sliding arm or catch c is pivoted one end of a strap or bar, d, the other end of which is pivoted to the rear end of a link, e, which link is pivotally connected at or near its center, by a bolt or otherwise, with the link P, the link P having a projection or stud, Q, which forms a bearing for the pivoting-bolt, and also keeps the two links apart, so that they cannot become accidentally interlocked.

Near the forward end of the link e is pivoted one end of a rod, f, the other end of which is connected with the bell-crank lever g, located below the bell-crank lever h on the lever N. The lever g passes both sides of the lever N, and that side which is adjacent to the lever h is provided with an arm or extension, i', the end of which engages with the point or projection i on the lever h, so that the two levers will be interlocked, and a movement of one will move the other—that is to say, if the lever g is depressed, the arm i' will act on the point i and throw the lever h up, and if the lever g be raised the arm i' will act on the point i and throw the lever h down.

The link e, at its forward end, is slotted, and one portion is made to project forward of the other and form an extension or arm, n, which, as the arm R is carried forward, will come in contact with the stop o on a plate, p, which plate is attached to the side of the support K. This plate p is provided with a slot, by means of which the location of the stop o is kept adjusted, so that the arm n will come in contact therewith when the arm R has raised the plow out of the ground.

Between the links e and P, and around the stud Q, is a spring, l, one arm of which is connected with or engages a pin or catch, m, on the link P and the other is connected with or engages a pin or catch, m', on the link e, so that the link e, when the catch c is raised, will be held in position to prevent its rear end from vibrating accidentally and throwing the catch into engagement.

The operation is as follows: When the plow is to be lifted through the power of the team the driver takes hold of and depresses the lever $g$, which at the same time, through the arm $i'$ and point $i$, throws down the lever $h$, as before described, releasing the pawl $k$ from engagement with the rack O. The downward movement of the lever $g$, through the rod $f$, raises the forward end of the link $e$ and depresses the rear end thereof, which, through the strap $d$, projects the end of the arm or catch $c$ so that it will be caught by one of the notches $b$ of the plate $a$, which plate revolves with the wheel, and by its forward movement raises the arm R, turning the cross-piece or connection S and lifting the crank C, raising the plow out of the ground. This forward movement will continue until the plow is raised, at which time the forward end or arm $n$ of the link $e$ comes in contact with the stop $o$, throwing the forward end of the link down and raising its rear end, and through the strap $d$ lifting the catch $c$, and at the same time the downward movement of the forward end of the link $e$, through the rod $f$, depresses the lever $g$, and this lever, through its arm $i'$ and the point $i$, raises the lever $h$, which throws the pawl $k$ connected therewith into engagement with the rack O, and through the lever N holds the plow in its suspended position. By this arrangement it will be seen that the driver is free to use either form of lift, and that as lifting devices they are independent of each other, and at the same time either one can be operated readily.

The team lifting devices are very simple in construction, easily operated, and will do the work required in an effectual and reliable manner, and in event that the party who uses the plow does not require or wish a team-lift the devices which constitute such lifts can be removed without impairing or injuring the hand-lift devices, which are not changed or affected in any manner by such removal.

By making the plate $p$ adjustable the stop $o$ can be raised or lowered, so that the end or arm $n$ will come in contact therewith at the precise movement required to release the catch $c$ and throw the rack-pawl into engagement, and that such adjustment enables any wear of the link $e$ or other parts to be compensated for, so that such wear will not affect the proper working of the parts.

By making the levers $g$ $h$ interlock one with the other, one lever sustains the other in whatever position it may be and prevents it from being thrown out of the position by the travel of the plow over the ground or from any other cause, so as to release the lever-lock or throw the catch $c$ into engagement, except when required for lifting purposes.

The bail or crank B, at its forward ends, is connected with suitable hangers or ears, each of which has a pivot to enter the vertical sides of the frame, the ear on the furrow-wheel side being attached to the axle or cross-piece S, as before described.

By releasing the catch $c$ from the notches $b$ automatically at the instant the plow is raised to the extent of the elevation that is required it will be seen that no straining of the parts will occur, and at the same time the machine is left free to travel forward without interference from the lifting devices.

When using the lever N as a hand-lever simply the pawl or lock $k$ can be released by the bell-crank lever $h$ without affecting the bell-crank lever $g$, which will remain in position to keep the catch C disengaged; but the bell-crank lever $g$ cannot be operated without affecting the lever $h$.

What we claim as new, and desire to secure by Letters Patent, is—

1. The combination, with the crank C, of the notched plate $a$, located on the furrow-wheel hub, the sliding arm or catch $c$, located on the lifting-arm R, the strap or bar $d$, the link $e$, provided with an extension, $n$, the connecting-rod $f$, the bell-crank levers $g$ $h$ upon the arm N, and the strap $o$, for automatically raising the arm or catch when the plow is raised, substantially as described.

2. The combination, with the lifting-lever N, of the segmental rack O, the connecting-link P, arranged between the lifting-lever and lifting-arm, and the lifting-arm R, the bail or crank connected with said lifting-arm, the notched plate $a$, located on the furrow-wheel hub, the sliding arm or catch $c$, the strap $d$, link $e$, connecting-rod $f$, and bell-crank levers upon the lifting-lever N, said members being organized for operation substantially as described.

THOMAS A. CONLEE.
JOHN H. KENNETH.

Witnesses:
CHARLES H. NOBLE,
FRANCIS P. BECK.